Patented Apr. 30, 1940

2,199,099

UNITED STATES PATENT OFFICE 2,199,099

METHOD OF COMPOUNDING RUBBER

Edward N. Cunningham, Cuyahoga Falls, Ohio, assignor to The B. F. Goodrich Company, New York, N. Y., a corporation of New York No Drawing. Application February 24, 1938,
Serial No. 192,394

6 Claims. (Cl. 260—763)

This invention relates to the compounding of rubber, and particularly to a new method whereby gas black may be incorporated in rubber much more rapidly than by ordinary methods and with less expenditure of mechanical energy. This may be accomplished without greatly reducing the plasticity of the compounded rubber below that of the original rubber.

In the past, incorporation of gas black in rubber has presented many difficulties. The rate at which the rubber takes up the gas black is very slow, long mastication is necessary to obtain good dispersion of the gas black in the rubber, and the plasticity of the resulting composition is much less than that of the original rubber. Increasing the plasticity by masticating the rubber before incorporating the gas black does not solve the problem, for the plasticity of the resulting compositions is affected to only a small degree by changes in the original plasticity of the rubber. For example, mixing in air in an internal mixer at 240° F. 31 volumes (60 parts by weight) of channel gas black with 100 parts of rubber of an initial plasticity of 9.37 gave a resulting composition having a plasticity of 4.2 as measured on the Goodrich plastometer. When the plasticity of the original rubber was 32.1 the plasticity of the composition was 4.12, and when the plasticity of the original rubber was 77.5 the plasticity of the resulting composition was 4.54, all samples being measured at 85° C.

I have discovered that by incorporating gas black in rubber in an atmosphere containing activated oxygen or oxygen in amounts greater than those ordinarily present in air, I am able to increase the rate of mixing of gas black into rubber, to improve the dispersion of the gas black in the rubber, and to decrease the loss in plasticity due to the addition of carbon black or in some cases to produce a composition having even higher plasticity than the original rubber. When the incorporation of the gas black is performed in the presence of activated oxygen or in the presence of high concentrations of oxygen, the resulting batch will usually have a plasticity suitable for subsequent processing without additional mastication.

The principles underlying the invention may best be understood by comparing the results obtained in a series of tests in which gas black was incorporated in rubber under varying temperature conditions in the presence of atmospheric air, commercial oxygen, and activated oxygen which contained about 1% ozone. In all the following tests, the processing of the rubber was carried out in a Schiller type internal mixer with individually driven Banbury type blades, a jacket for circulating steam or cooling water as required to maintain the desired temperature of the rubber undergoing mastication, and a tight-fitting cover with an inlet and outlet for circulating gas through the mixing chamber. The plasticity of the rubber was measured at 85° C. with a Goodrich plastometer.

The complete batch contained 100 parts by weight of rubber and 50 parts of channel gas black. The rubber was placed in the mixing chamber, and the black was placed in a reservoir leading into the mixing chamber through the lid. The entire system was flushed with the gas to be used before the mixing was begun. The rubber was masticated for four minutes after which the gas black was added in four equal portions at four minute intervals. Mastication was continued for a total time of thirty-two minutes, when the batch was removed and the plasticity was measured.

| Mastication temperature | Plasticity at 85° C. of batch mixed in— | | |
|---|---|---|---|
| | Air | Oxygen | Activated oxygen |
| 190°±10° F | 5.7 | 7.2 | 11.3 |
| 240°±5° F | 3.3 | 8.3 | 21.6 |

As can be seen from the above results, addition of gas black in an atmosphere of oxygen or activated oxygen produced a product having much higher plasticity than addition in air. The rubber used in the above tests had an original plasticity of 8.13, which is about the same as the final plasticity of the batches mixed in oxygen, while addition of carbon black in activated oxygen produced a batch having a much higher plasticity than the original rubber. Other beneficial results are obtained by this treatment. The gas black was taken up almost immediately by the rubber which was masticated in activated oxygen, although considerable time was required for the incorporation of the gas black in the batch masticated in air. The degree of dispersion of the gas black in the rubber as determined by the method of Schoenfeld and Allen, Ind. Eng. Chem. 25, 994 (1933), was found to be much greater in the batch masticated in activated oxygen, while the poorest dispersion was obtained in air.

In another test carried out like those above, 59 parts by weight of gas black were incorporated in 100 parts of rubber at 240° F., the results being recorded below:

| Atmosphere | Plasticity at 100° C. |
|---|---|
| Hydrogen | 3.3 |
| Air | 5.8 |
| Oxygen | 8.9 |
| Activated oxygen | 43.2 |

It will be observed that the oxygen in the air produced some improvement in plasticity, that commercial oxygen produced more, and that a very remarkable improvement in the plasticity of the final batch was obtained by incorporating the gas black in an atmosphere of activated oxygen.

Though pure or commercial oxygen has a greater effect, it is within the scope of this invention to use mixtures of oxygen with other gases or to use air which has been fortified by the addition of oxygen thereto. When the oxygen is obtained from an anhydrous source, liquid oxygen for instance, better results are obtained if it is bubbled through water or if the humidity is increased by other means.

The activated oxygen utilized in the present process may be supplied as ozone, ozonized oxygen, ozonized air, etc., prepared in any well known manner and used either alone or admixed with other gases. The gas may be caused to flow through the masticating apparatus if it be of the enclosed type, or the gas may be released near the surface of rubber being masticated upon a roll mill which preferably should be equipped with a hood to confine the gas.

The term "rubber" is used in the specification and claims in a generic sense to include caoutchouc, balata, gutta percha, unsaturated synthetic rubbers, particularly those containing polymers of butadiene or its derivatives such as chlorobutadiene and methyl butadiene, reclaimed rubber, etc.

By the method of this invention any kind of gas black or carbon black in powdered, pelleted or other form may be incorporated into rubber. The invention is most valuable, however, in incorporating in rubber the highly reinforcing type of gas black known to the trade as channel gas black.

The temperature at which the incorporation of the gas black is performed may be varied over wide limits. In general the beneficial effects obtained by practicing the method of this invention are greater at higher temperatures, the most pronounced effects being obtained at temperatures of from 220 to 320° F. and above.

While I have herein described one embodiment of this invention with reference to certain preferred procedures, apparatus and materials, I do not intend to limit myself solely thereto, for many modifications and variations therein are within the spirit and scope of the invention as defined in the appended claims.

I claim:

1. The method which comprises incorporating gas black in rubber in the presence of a member of the class consisting of oxygen and activated oxygen in an amount greater than that ordinarily present in air.

2. The method which comprises incorporating gas black in natural rubber in the presence of a member of the class consisting of oxygen and activated oxygen in an amount greater than that ordinarily present in air.

3. The method which comprises incorporating at a temperature of at least 220° F. gas black in natural rubber in the presence of a member of the class consisting of oxygen and activated oxygen in an amount greater than that ordinarily present in air.

4. The method which comprises incorporating gas black in natural rubber undergoing mastication in the presence of a gas containing approximately one percent of ozone.

5. The method which comprises incorporating gas black at a temperature of about 220° F. in natural rubber in the presence of an amount of oxygen greater than that ordinarily present in air.

6. The method which comprises incorporating gas black at a temperature of about 220° F. in natural rubber in the presence of an amount of activated oxygen greater than that ordinarily present in air.

EDWARD N. CUNNINGHAM.